United States Patent
Cowart

[19]

[11] Patent Number: 5,918,476
[45] Date of Patent: Jul. 6, 1999

[54] REPLACEMENT KIT FOR VEHICLE AIR CONDITIONING CIRCUIT PRESSURE OPERABLE VALVES

[76] Inventor: Darrow W. Cowart, 5702 Fireside Dr., Arlington, Tex. 76016

[21] Appl. No.: 08/975,005

[22] Filed: Nov. 20, 1997

[51] Int. Cl.⁶ ............................. F25B 1/00; F25B 27/00
[52] U.S. Cl. ........................ 62/227; 62/228.3; 62/323.4
[58] Field of Search .................................. 62/227, 323.4, 62/228.3, 217

[56] References Cited

U.S. PATENT DOCUMENTS

Re. 21,710   2/1941   Smith .................................. 62/228.3 X
4,463,576   8/1984   Burnett et al. .

*Primary Examiner*—William Wayner
*Attorney, Agent, or Firm*—Melvin A. Hunn

[57] ABSTRACT

A replacement kit allows the replacement of a pressure operable valve of a vehicle air conditioning circuit, from a mechanically operated valve to an electrically actuated switch. The kit includes a replacement cylinder, a sensor controlled electrical switch coupling to the vehicle adjacent to the evaporator with the sensor probe coupled to the refrigerant flow from the evaporator, and a conductor means for electrically coupling the sensor controlled electrical switch to the clutch cycling system of the vehicle.

13 Claims, 5 Drawing Sheets

REPLACEMENT KIT FOR VEHICLE AIR CONDITIONING CIRCUIT PRESSURE OPERABLE VALVES

BACKGROUND OF THE INVENTION

1. Field of the Invention

This invention relates in general to vehicle air conditioning systems, and specifically to replacement kits for vehicle air conditioning valves.

2. Description of the Prior Art

Many vehicles currently on the road have air conditioning systems which include as a refrigerant circuit component a pressure operable valve, such as suction throttling valve ("STV" valve) or a pilot operated absolute valve ("POA" valve). These valves are used in vehicle air conditioning circuits, and are coupled between the evaporator core and the compressor. Unfortunately, General Motors Corporation utilizes the term "Pressure Operated Absolute Valves" for the same part that Ford Motor Company identifies as a "suction throttle valve." For purposes of this application, applicant will utilize the term "pressure operated absolute valve" ("POA" valve), or "pressure operable valves."

These pressure operable valves contain tiny orifices which are subject to clogging, since tiny particles of rubber and metal may be carried in the air conditioning circuit as the circuit deteriorates with age. Accordingly, these valves need periodic replacement, which can be expensive, and which can result in the undesirable venting of refrigerant gases into the environment.

The damage done to the planet's ozone due to undesirable venting of such gases has been widely publicized, and has been recognized as a formidable environmental problem which must be effectively dealt with.

It is desirable to replace refrigeration circuit elements which are susceptible to damage, and corresponding leakage or venting of refrigerant, with components which are not so susceptible to mechanical failure, and not subject to frequent replacement.

To fill this growing need, the present invention is a replacement kit which may be used to permanently replace certain pressure operable valves, with a mechanism which is not susceptible to clogging, and not requiring frequent replacement, additionally, the present invention (once installed) most of the active operating components can be repaired without requiring capture and recharge of the refrigerant.

SUMMARY OF THE INVENTION

It is one objective of the present invention to improve the operating performance of the air conditioning system of certain vehicles by replacing certain refrigerant circuit elements which are susceptible to damage, and whose damage and repair result in monetary expenses and leakage and venting of refrigerant.

It is yet another objective of the present invention to provide a replacement kit for substituting a sensor controlled electrically operated switch in place of a pressure operable valve, in the air conditioning systems of certain vehicles.

The foregoing and additional objectives are achieved as follows. In certain vehicles, a "pressure operable absolute valve," such as a suction throttling valve in some Ford vehicles and a pilot operated absolute valve in some General Motors, and other, vehicles, is positioned in the air conditioning circuit between the evaporator and the compressor. The pressure operable valve incudes a valve body having an inlet for coupling to the evaporator and receiving low pressure gaseous refrigerant discharge from the evaporator, and an outlet for coupling to the suction intake of the compressor. A chamber interconnects the inlet and the outlet of the valve body. Passage of the gaseous refrigerant is mechanically controlled through the chamber based on the pressure of the gas. In order to effect this pressure-based mechanical control, the valves contain tiny orifices which are subject to clogging, since tiny particles of rubber and metal may be carried in the air conditioning circuit as the circuit deteriorates with age.

The replacement kit for modifying the pressure operable valve includes a number of components. A replacement cylinder is adapted with male and female connectors at opposing ends for placement in the air conditioning circuit in the position of the defective pressure operable valve. The replacement cylinder is coupled so as to communicate with the compressor and the evaporator, acting as a passthrough chamber. A sensor control package provides an environmental sensor, an electrical switch, and means for integrating the sensor and switch into the circuit so as to achieve accurate measurements. A sensor controlled electrical switch is used to cycle the compressor on or off depending upon the threshold outlet temperature from the evaporator.

If since threshold temperature is to be the controlling condition, a thermostatic electrical switch having a flexible elongated temperature probe is provided for coupling to the vehicle adjacent to the evaporator, with the flexible elongated temperature probe in contact with the evaporator. The thermostatic electrical switch is actuated in response to the temperature of the evaporator as sensed by the flexible elongated temperature probe. A fastener is provided for securing the elongated temperature probe in place on the evaporator. Thermally insulating tape is provided for wrapping around the flexible elongated temperature probe when coupled to the evaporator, to thermally insulate the flexible elongated temperature probe and ensure accurate measurement of evaporator temperature.

If threshold pressure is to be the controlling condition, then a pressure sensitive electrical switch having an integrally attached pressure sensor is provided which is attached to the replacement cylinder where it detects the pressure of the gaseous coolant passing from the evaporator through the cylinder.

In either case, a conductor means is provided for electrically coupling the sensor controlled electrical switch to the electrically actuated clutch cycling system of the vehicle, allowing the sensor controlled electrical switch to disengage the compressor when the temperature or pressure of the evaporator falls below a selected level to prevent icing of the evaporator.

The above as well as additional objectives, features, and advantages will become apparent in the following description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of the preferred embodiment when read in conjunction with the accompanying drawings, wherein:

DETAILED DESCRIPTION OF THE INVENTION

Figure 1:
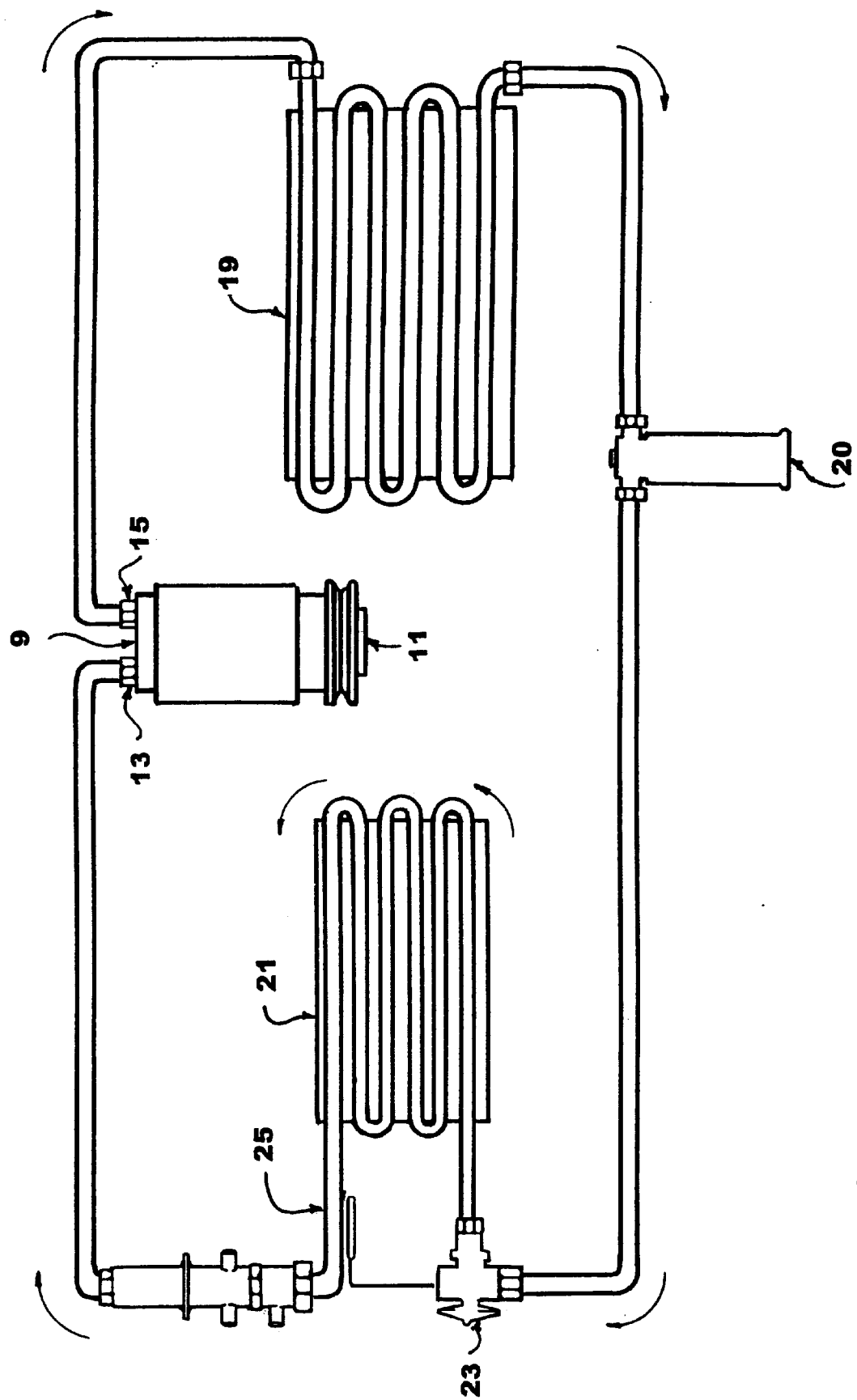
FIG. 1 is a simplified view of a prior art vehicle refrigeration circuit.

The state of the prior art will be described with reference to FIG. 1. FIG. 1 is a simplified view of a prior art vehicle air conditioning refrigeration circuit 9. Compressor 11 is provided for pressurizing a refrigerant, and has a suction intake 13 for receiving low pressure refrigerant in gaseous form, and an output 15 for discharging high pressure refrigerant in gaseous form. Compressor 11 also includes an electrically actuated clutch cycling system 17 (not shown in FIG. 1 but shown in FIG. 4) for engaging and disengaging the compressor in response to changes in air conditioning temperature sensed by a temperature sensor located in the vehicle.

The automotive air conditioning refrigeration circuit 9 also includes condenser 19, which is coupled to compressor 11 for receiving high pressure refrigerant in gaseous form from output 15 and discharging high pressure refrigerant in liquid form. Usually, refrigerant is routed from condenser 19 to dryer 20 which serves to remove water or water vapor from the refrigerant.

The refrigerant is then routed to evaporator 21 through expansion valve 23. Evaporator 21 receives high pressure liquid refrigerant from condenser 19, and discharges refrigerant in the form of a low pressure gas from outlet tube 25.

In certain vehicles, outlet tube 25 of evaporator 21 is coupled to compressor 11 through a pressure operable valve 27. Pressure operable valve 27 operates as a de-icing valve. It operates to maintain the temperature of the refrigerant in evaporator 21 above the freezing point of water. If the refrigerant in evaporator 21 falls below 32° F., water vapor present in the atmosphere tends to accumulate on evaporator 21 and freeze. For the air conditioning refrigerant, temperature and pressure are closely related. A rise in pressure indicates a rise in temperature. A decrease in pressure indicates a decrease in temperature. Pressure operable valve 27 operates by monitoring and regulating the pressure of evaporator 21.

In other words, the pressure operable valve 27 controls the evaporator 21 temperature by limiting the minimum pressure of the refrigerant in evaporator 21 to prevent freezing the condensate. The prevention of evaporator 21 freeze-up is important because any obstruction to the flow of air through evaporator 21 reduces the refrigerant effect of the system.

Figure 2:
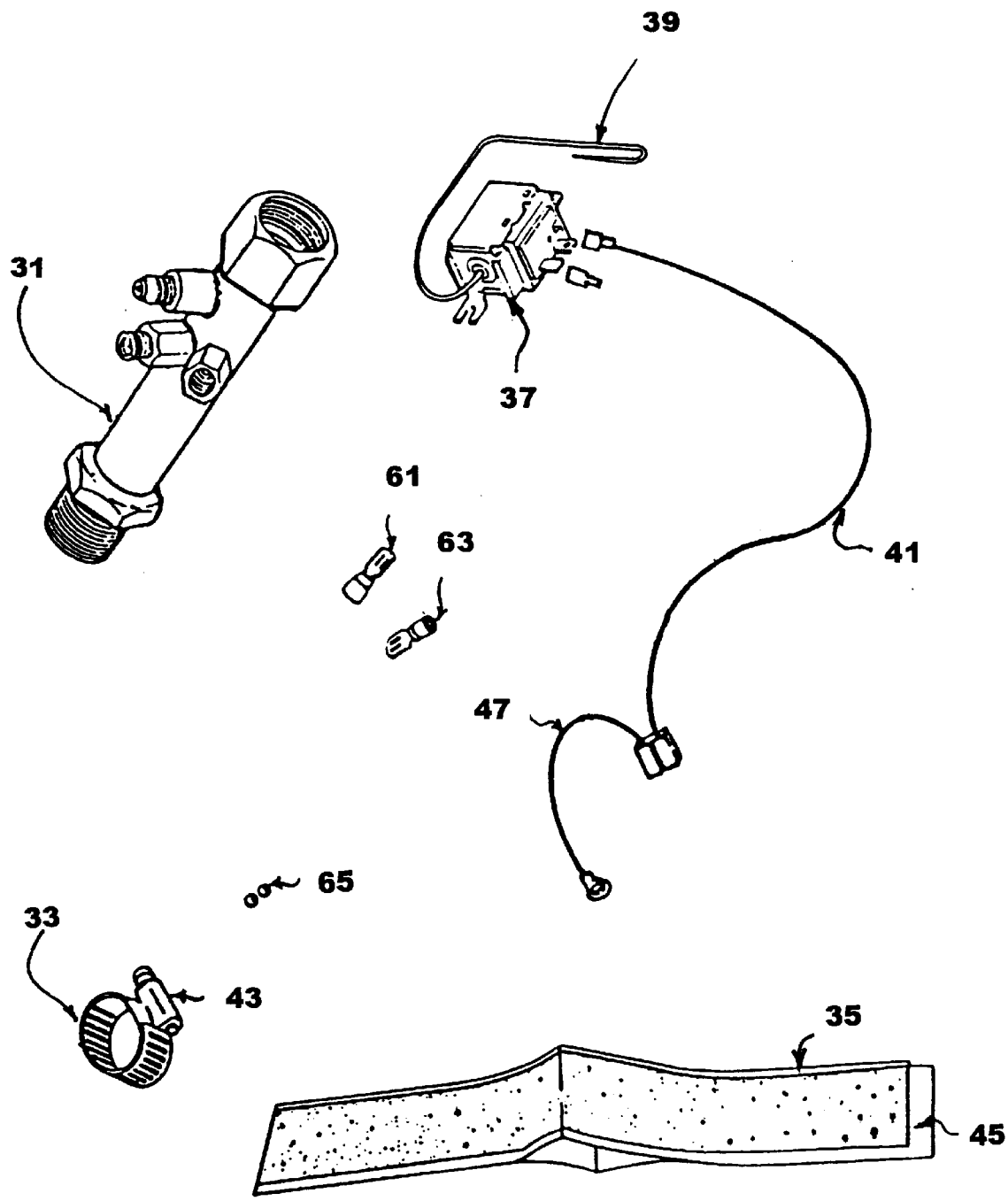
FIG. 2 is a perspective view of the replacement kit of the present invention.

FIG. 2 is a perspective view of the components which cooperate to make up one embodiment of the kit of the present invention.

The kit includes a replacement cylinder 31 having not less than three connections, which couples the outlet tube of the evaporator 25 to the compressor 11 (one large inlet from the evaporator, one charging port inlet, one large pressure port outlet, and some units may include an oil bleed line inlet). The replacement cylinder 31 acts as a passthrough conduit which may also be communicatively coupled to the thermostatic expansion valve 23 through an additional outlet. The replacement cylinder 31 may also have an oil bleed outlet. The replacement cylinder serves no direct de-icing function, nor does it serve to simulate authenticity of the pressure operable valve 27 it replaced.

The kit also includes thermostatic electrical switch 37 which has a flexible elongated temperature probe 39 connected thereto. In the preferred embodiment, thermostatic electrical switch 37 comprises a Ranco brand thermostatic switch Model No. A46-3133 (which is preset to switch at approximately 32° F.), or a Cutler Hammer band thermostatic switch Model No. 9533N409. Of course, other commercially available thermostatic electrical switches may be used as an alternative. In the preferred embodiment, thermostatic electrical switch 37 is mounted in the engine compartment of the car, preferably along the fire wall of the vehicle, out of sight. Flexible elongated temperature probe 39 is wrapped about outlet tube 25 of evaporator 21. Flexible elongated temperature probe 39 is held firmly in position about outlet tube 25 by operation of fastener 33. In the preferred embodiment, fastener 33 comprises a clamping fastener, of the type used in plumbing. This fastener includes an adjustment means 43 for enlarging or diminishing the size of the fastening loop. Thermally insulating material 35 is provided for wrapping around flexible elongated temperature probe 39 to insulate it from the heat generated by the vehicle engine. Thermally insulating material 35 ensure accurate measurement of the temperature of the refrigerant in evaporator 21. In the preferred embodiment, thermally insulating material 35 has an adhesive layer on one side, which interfaces with backing material 45 when in storage.

The kit of the temperature controlled embodiment of the present invention also includes two wires 41, 47 for coupling thermostatic electrical switch 37 to clutch cycling system 17 of compressor 11. This allows thermostatic electrical switch 37 to engage and disengage compressor 11 in response to the temperature of the refrigerant in evaporator 21. In the preferred embodiment, thermostatic electrical switch 37 is electrically coupled by one wire 41 to the thermostatic switch control of the vehicle air conditioner, and with another wire 47 to the power line of the clutch coil. In this configuration, thermostatic electrical switch 37 can serve to cut off electrical power to the clutch coil to impede the operation of compressor 11. If the temperature of the gaseous refrigerant in evaporator 21 drops below 32° F., thermostatic electrical switch 37 interrupts power to the clutch coil of compressor 11, causing an increase in pressure of the refrigerant in evaporator 21, and corresponding increase in temperature. When the temperature rises above 32° F. or the pressure rises above its predetermined level, sensor controlled electrical switch 37 closes, causing electrical power to be directed to the clutch coil of compressor 11.

The kit of the present invention also includes connectors 61, 63 for connecting wires 41, 47 to the appropriate terminals of the vehicle air conditioning system.

Figure 3:
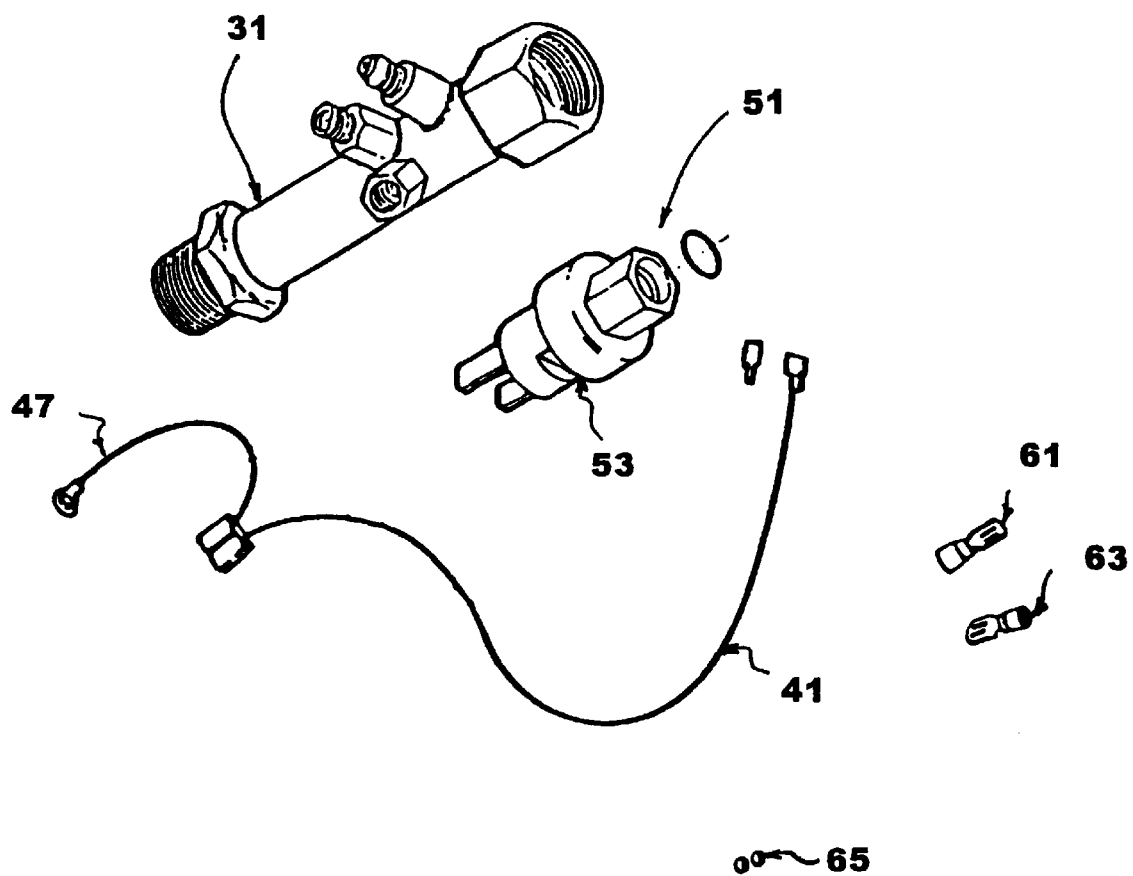
FIG. 3 is a perspective view of the pressure controlled embodiment o the replacement kit of the present invention.

FIG. 3 is a perspective view of the components which cooperate to make up the kit containing the pressure controlled embodiment of the present invention.

The kit includes a replacement cylinder 31 having not less than three outlets, which couples the outlet tube of the evaporator 25 to the compressor 11. The replacement cylinder 31 acts as a passthrough conduit which may also be communicatively coupled to the thermostatic expansion valve 23 through an additional outlet. The replacement cylinder 31 may also have an oil bleed outlet. The replacement cylinder 31 in the preferred embodiment for pressure controlled embodiment is also coupled to the pressure sensitive electrical switch 51 to provide the pressure sensor 53 communicative coupling with the coolant flowing out of the evaporator outlet 25 in order to facilitate measurement of the pressure of the exiting coolant. The replacement cylinder serves no direct de-icing function, nor does it serve to simulate authenticity of the pressure operable valve 27 it replaced.

The kit of the present invention in its pressure controlled embodiment also includes a pressure sensitive electrical switch 51 having an integrally connected pressure sensor 53. The pressure sensor 53 is placed in communicative coupling with the coolant flow from the evaporator 21 in order to measure the pressure of coolant flow. Coupling with the coolant flow at the replacement cylinder 31 provides a frame for coupling the pressure sensitive switch 51 into the flow path near the evaporator 21, while avoiding the possible difficulties in interference with pressure readings due to temperature effects and interference in evaporator function incurred by coupling the pressure sensitive switch 51 to the evaporator 21 itself.

The kit of the present invention also includes two wires 41, 47 for coupling pressure sensitive electrical switch 51 to clutch cycling system 17 of compressor 11. This allows pressure sensitive electrical switch 51 to engage and disengage compressor 11 in response to the temperature of the coolant in evaporator 21. In the preferred embodiment, pressure sensitive electrical switch is electrically coupled by one wire 41 to the thermostatic switch control of the vehicle air conditioner, and with another wire 47 to the power line of the clutch coil. In this configuration, pressure sensitive electrical switch 51 can serve to cut off electrical power to the clutch coil to impede the operation of compressor 11. If the pressure of the gaseous coolant in evaporator 21 drops below a predetermined level pressure sensitive electrical switch 51 interrupts power to the clutch coil of compressor 11, causing an increase in pressure of the coolant in evaporator 21, and corresponding increase in temperature. When the pressure rises above its predetermined level, pressure sensitive electrical switch 51 closes, causing electrical power to be directed to the clutch coil of compressor 11.

The kit of the present invention also includes connectors 61, 63 for connecting wires 41, 47 to the appropriate terminals of the vehicle air conditioning system.

Figure 4:
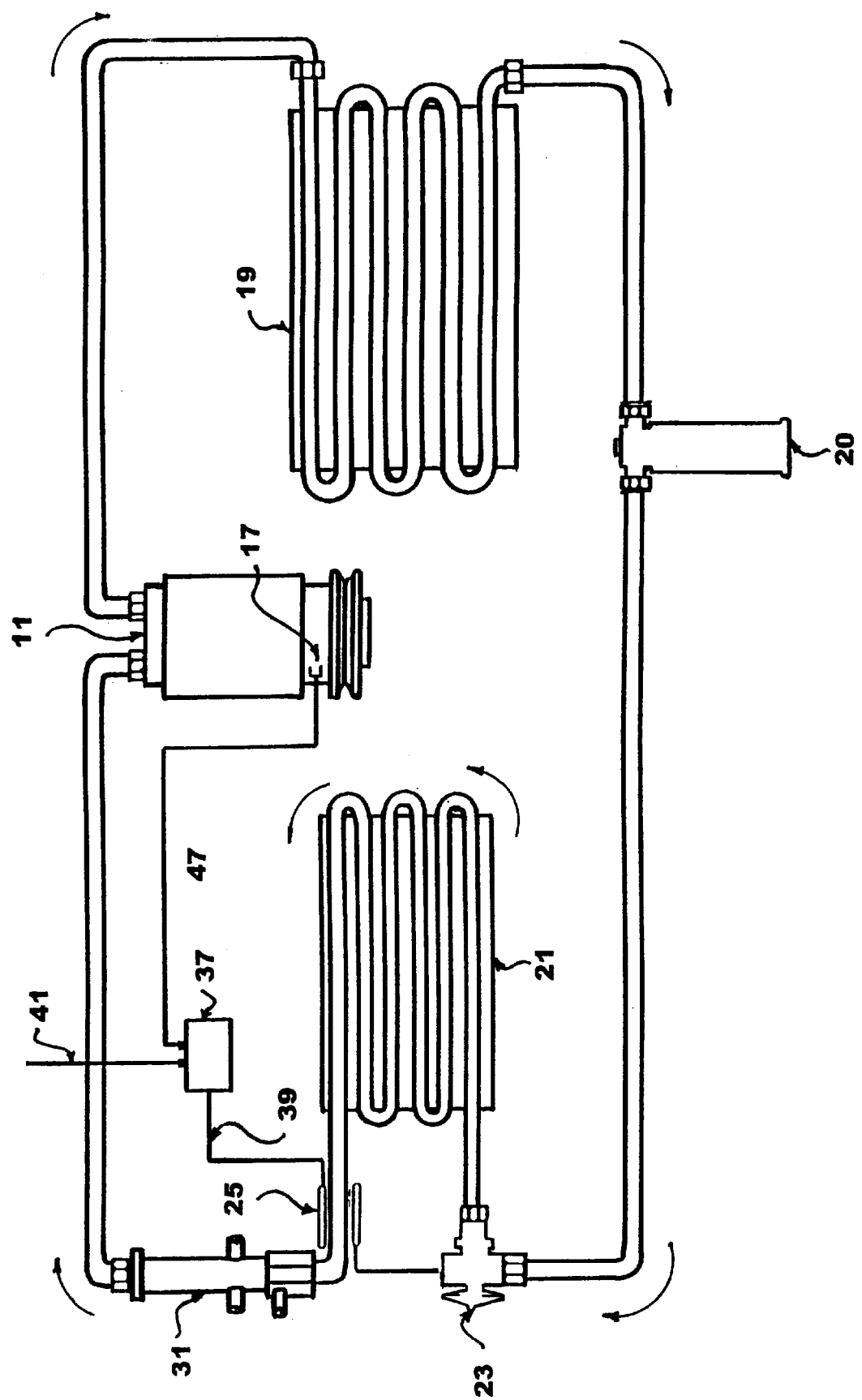
FIG. 4 is a simplified view of a vehicle refrigerant circuit modified in accordance with the present invention.

FIG. 4 is a simplified view of the vehicle air conditioning circuit modified according to the present invention. Pressure operable valve (27 in FIG. 1) has been replaced by replacement cylinder 31. Replacement cylinder 31 serves merely as a passthrough conduit for refrigerant.

Thermostatic electrical switch 37 is mounted in the engine cavity, preferably out of sight. Flexible elongated temperature probe 39 is wrapped about outlet tube 25 of evaporator 21. Flexible elongated temperature probe 39 is mounted in place by fastener 33, and covered thermally insulating material 35 to insulate the temperature probe from the heat generated by the engine.

Wires 41, 47 couple sensor controlled electrical switch 37 between the vehicle thermostatic switch control 17 and the power line of the clutch coil of compressor 11.

Figure 5:
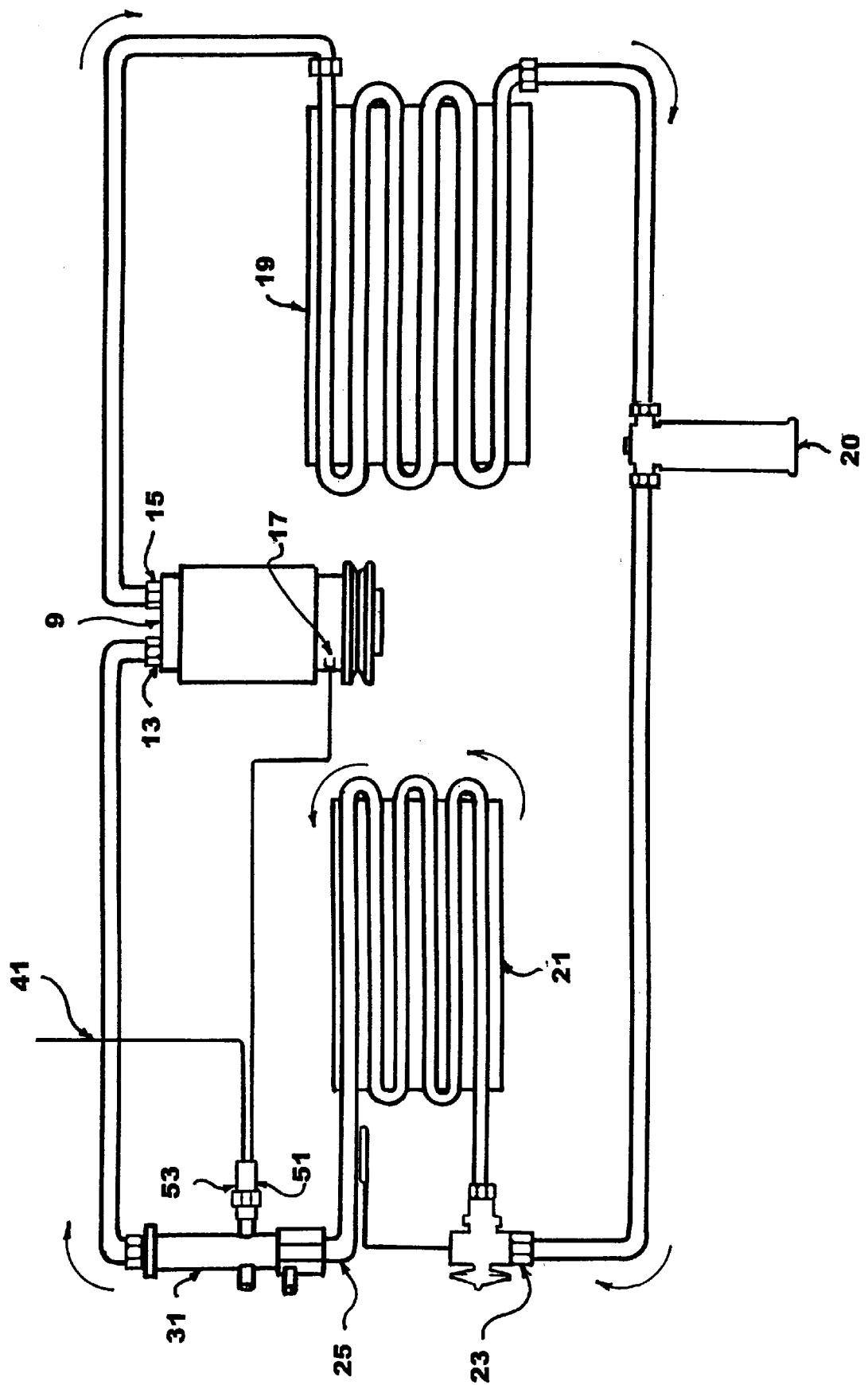
FIG. 5 is a simplified view of a vehicle refrigerant circuit modified by the pressure controlled embodiment of the present invention.

FIG. 5 is a simplified view of the vehicle air conditioning circuit modified according to the pressure controlled embodiment of the present invention. Pressure operable valve 27 has been replaced by replacement cylinder 31. Replacement cylinder 31 serves merely as a passthrough conduit for coolant.

Pressure sensitive electrical switch 51 is coupled to the replacement cylinder 31. Integrally connected with pressure sensitive switch 51 is pressure sensor 543 which is communicatively coupled with said coolant as it flows out of said evaporator 21.

Wires 41, 47 couple pressure sensitive electrical switch 51 between the vehicle thermostatic switch control 17 and the power line 17 and the power line of the clutch coil of compressor 11.

The present invention allows for the improvement of the operating performance of the air conditioning system of certain cars and thus reducing leakage and venting of environmentally hazardous refrigerant gases. The kit of the present invention allows for an easy replacement between a mechanical pressure operable valve and a sensor controlled electrical switch. The electrical switch is less prone to failure, and should provide many years of trouble free operation, in contrast with the mechanical pressure operable valve which has proven to be prone to failure, and expensive to repair.

Although the invention has been described with reference to two particular embodiments, this description is not meant to be construed in a limiting sense. Various modifications of the disclosed embodiments as well as alternative embodiments of the invention will become apparent to persons skilled in the art upon reference to the description of the invention. It is therefore contemplated that the appended clams will cover any such modifications or embodiments that fall within the scope of the invention.

What is claimed is:

1. A kit for replacing a pressure operable valve of a vehicle, which is coupled in an air conditioning circuit of said vehicle;

said automotive air refrigeration circuit including:
(a) a compressor for pressurizing refrigerant, having a suction intake for receiving low pressure refrigerant in gaseous form, an output for discharging high pressure refrigerant in a gaseous form, and an electrically actuated clutch cycling system for engaging and disengaging said compressor, wherein a vehicle thermostatic switch selectively actuates said clutch cycling system to engage and disengage said compressor in response to changes in air conditioning temperature sensed by a temperature sensor in said vehicle;
(b) a condenser coupled to said compressor for receiving high pressure refrigerant in gaseous form from said output of said compressor and discharging high pressure refrigerant in liquid form;
(c) an evaporator coupled to said condenser for receiving high pressure liquid refrigerant from said condenser and discharging refrigerant in the form of low pressure gas from an outlet tube into said suction intake of said compressor;
(d) wherein vehicle air is cooled as it is circulated over said evaporator, and wherein said pressure operable vale is coupled in said air conditioning circuit between said evaporator and said compressor to maintain pressure within said evaporator at a preselected level to prevent icing of said evaporator;

said pressure operable valve including:
(a) a valve body having an inlet for coupling to said evaporator and receiving low pressure gaseous refrigerant discharged from said evaporator, and an outlet for coupling to said suction intake of said compressor, said inlet and outlet interconnected by a chamber;
(b) a portion of said chamber defining a barrier in said chamber, said barrier being penetrated by tiny orifices to permit some passage of refrigerant gas to allow pressure controlled mechanical valve actions to take place, said chamber being used to control the flow of refrigerant between said inlet and said outlet of said valve body;

said kit comprising:

(a) a replacement cylinder having an inlet for coupling to said evaporator and receiving low pressure gaseous refrigerant discharged from said evaporator, and an outlet for coupling to said suction intake of said compressor, said replacement cylinder to provide a passthrough connection between said evaporator and said compressor replacing said pressure operable valve, with said replacement cylinder serving only a pass through function;

(b) a sensor control package including a sensor controlled electrical switch having a sensing device, for coupling to said vehicle adjacent to said refrigerant flow from said evaporator, with said sensor coupled to said refrigerant flow, wherein said sensor controlled electrical switch is actuated in response to environmental condition of said refrigerant flow from said evaporator as sensed by said sensing device; and (c) conductor means for electrically coupling said sensor controlled electrical switch to said electrically actuated clutch cycling system of said vehicle for allowing said sensor controlled electrical switch to disengage said compressor when the environmental condition of said evaporator falls below a selected level to prevent icing of said evaporator.

2. A kit for replacing a pressure operable valve of a vehicle according to claim 1, wherein said sensor control package comprises:

(a) a thermostatic electrical switch having a flexible elongated temperature probe, for coupling to said vehicle adjacent said evaporator with said flexible elongated temperature probe in contact with said evaporator, wherein said thermostatic electrical switch is actuated in response to temperature of said evaporator sensed by said flexible elongated temperature probe;

(b) fastener means for securing said elongated temperature probe in place; and (c) thermally insulating material for wrapping around said flexible elongated temperature probe when coupled to said evaporator by said fastener means, to thermally insulate said flexible elongated temperature probe and ensure accurate measurement of temperature of said refrigerant flow.

3. A kit for replacing a pressure operable valve of a vehicle according to claim 2, wherein said fastener means comprises a circular strap with an adjustment means for expanding and contracting said circular strap.

4. A kit for replacing a pressure operable valve of a vehicle according to claim 2, wherein said thermally insulating material has an adhesive on at least one side.

5. A kit for replacing a pressure operable valve of a vehicle according to claim 1, wherein said sensor control package comprises:

a pressure sensitive electrical switch integrally connected with a pressure sensor, said pressure sensitive electrical switch coupled to said replacement cylinder and said pressure sensor communicatively coupled to said coolant flow; wherein said pressure sensitive electrical switch is actuated in response to pressure of said coolant flow sensed by said pressure sensor.

6. A kit for replacing a pilot operated absolute valve, which is coupled in an air conditioning circuit of a vehicle; said automotive air refrigeration circuit including:

(a) a compressor for pressurizing a refrigerant, having a suction intake for receiving low pressure refrigerant in gaseous form, an output for discharging high pressure refrigerant in a gaseous form, and an electrically actuated clutch cycling system for engaging and disengaging said compressor, wherein a vehicle thermostatic switch selectively actuates said clutch cycling system to engage and disengage said compressor in response to changes in air conditioning temperature sensed by a temperature sensor in said vehicle;

(b) a condenser coupled to said compressor for receiving high pressure refrigerant in gaseous form from said output of said compressor and discharging high pressure refrigerant in liquid form;

(c) an evaporator coupled to said condenser for receiving high pressure liquid refrigerant from said condenser and discharging refrigerant in the form of low pressure gas from an inlet tube into said suction intake of said compressor;

(d) wherein vehicle air is cooled as it is circulated over said evaporator, and wherein said pilot operated absolute valve is coupled in said air conditioning circuit between said evaporator and said compressor to maintain pressure within said evaporator at a preselected level to prevent icing of said evaporator;

said pilot operated absolute valve including:

(a) a valve body having an inlet for coupling to said evaporator and receiving low pressure gaseous refrigerant discharged from said evaporator, and an outlet for coupling said suction intake of said compressor, said inlet and outlet interconnected by a chamber;

(b) some portion of said chamber being penetrated by tiny orifices permitting some passage of refrigerant gas necessary for proper function of said pilot operated absolute valve, said chamber being used to control the flow of refrigerant between said inlet and said outlet of said valve body;

said kit comprising:

(a) a replacement cylinder having an inlet for coupling to said evaporator and receiving low pressure gaseous refrigerant discharged from said evaporator, and an outlet for coupling said suction intake of said compressor, said replacement cylinder to provide a passthrough connection between said evaporator and said compressor, replacing said pilot operated absolute valve, said replacement cylinder serving bypass function purposes only;

(b) a sensor control package including a sensor controlled electrical switch having a sensing device, for coupling to said vehicle adjacent to said refrigerant flow from said evaporator, with said sensor sufficiently related to said refrigerant flow to permit precise environmental readings of at least one environmental condition of said refrigerant flow, wherein said sensor controlled electrical switch is actuated in response to environmental condition of said refrigerant flow from said evaporator sensed by said sensing device; and (c) conductor means for electrically coupling said sensor controlled electrical switch to said electrically actuated clutch cycling system of said vehicle for allowing said sensor controlled electrical switch to disengage and said compressor when the environmental condition of said evaporator falls below a predetermined level to prevent icing of said evaporator.

7. A kit for replacing a pilot operated absolute valve, according to claim 6, wherein said sensor control package comprises:

a thermostatic electrical switch having a temperature probe, for coupling to said vehicle proximate said refrigerant flow from said evaporator with said temperature probe in sufficient coupled contact with said refrigerant flow to precisely measure the temperature of said refrigerant flow, wherein said thermostatic electrical switch is actuated in response to temperature of said refrigerant flow sensed by said temperature probe.

8. A kit for replacing a pilot operated absolute valve, according to claim 7, wherein said sensor control package comprises:

fastener means for securing said temperature probe in place; and thermally insulating material for wrapping said temperature probe when in coupled contact with said refrigerant flow by said fastener means, to thermally insulate said temperature probe and ensure precise measurement of temperature of said refrigerant flow.

9. A kit for replacing a pilot operated absolute valve, according to claim 6, wherein said sensor control package comprises:

a pressure sensitive electrical switch coupled with a pressure sensor, said pressure switch coupled proximate said refrigerant flow from said evaporator and said pressure sensor communicatively coupled to said refrigerant flow; wherein said pressure sensitive electrical switch is actuated in response to pressure of said refrigerant flow sensed by said pressure sensor.

10. A kit for replacing a pilot operated absolute valve, which is coupled in an air conditioning circuit of a vehicle, comprising:

(a) a replacement cylinder having an inlet for coupling to an evaporator and receiving low pressure gaseous refrigerant discharged from said evaporator, an outlet for coupling to a suction intake of a compressor, allowing said replacement cylinder to provide a passthrough connection for a refrigerant flow between said evaporator and said compressor, replacing said pilot operated absolute valve, and serving only a pass through function;

(b) a sensor control package including a sensor controlled electrical switch having a sensing device, for coupling to said vehicle proximate said refrigerant flow from said evaporator, with said sensor sufficiently related to said refrigerant flow to permit precise environmental readings of at least one environmental condition of said refrigerant flow, wherein said sensor controlled electrical switch is actuated in response to an environmental condition of said refrigerant flow from said evaporator as sensed by said sensing device; and (c) conductor means for electrically coupling said sensor controlled electrical switch to an electrically actuated clutch cycling system of said vehicle for allowing said sensor controlled electrical switch to disengage said compressor when the environmental condition of said evaporator falls below a predetermined level to prevent icing of said evaporator.

11. A kit for replacing a pilot operated absolute valve, according to claim 10, wherein said sensor control package comprises:

a thermostatic electrical switch having a flexible elongated temperature probe, for coupling to said vehicle proximate said refrigerant flow from said evaporator with said flexible elongated temperature probe in contact with said evaporator, wherein said thermostatic electrical switch is actuated in response to temperature of said evaporator sensed by said flexible elongated temperature probe;

fastener means for securing said elongated temperature probe in place; and thermally insulating material for wrapping around said flexible elongated temperature probe when coupled to said evaporator by said fastener mans, to thermally insulate said flexible elongated temperature probe and ensure precise measurement of temperature of said refrigerant flow.

12. A kit for replacing a pilot operated absolute valve, according to claim 10, wherein said fastener means comprises a circular strap with an adjustment means for expanding and contracting said circular strap.

13. A kit for replacing a pilot operated absolute valve, according to claim 10, wherein said thermally insulating material has an adhesive on at least one side.

\* \* \* \* \*